United States Patent [19]

Jost

[11] Patent Number: 5,288,154
[45] Date of Patent: Feb. 22, 1994

[54] SPLASH-PROOF BEARING ARRANGEMENT HAVING A HORIZONTAL AXIS

[75] Inventor: Ralph Jost, Füllinsdorf, Switzerland

[73] Assignee: Hobas Engineering AG, Basel, Switzerland

[21] Appl. No.: 963,858

[22] Filed: Oct. 20, 1992

[30] Foreign Application Priority Data

Oct. 23, 1991 [CH] Switzerland ................... 3094

[51] Int. Cl.⁵ .................... F16C 33/80; F16C 33/66
[52] U.S. Cl. .................................. 384/480; 384/468
[58] Field of Search ............ 384/463, 468, 477, 480, 384/474, 473, 488

[56] References Cited

U.S. PATENT DOCUMENTS

| | | | |
|---|---|---|---|
| 2,132,249 | 10/1938 | Van Pelt . | |
| 2,681,837 | 6/1954 | Boyd . | |
| 2,740,647 | 4/1956 | Van Pelt . | |
| 2,770,506 | 11/1956 | Derner | 384/468 |
| 3,679,277 | 7/1972 | Dohmen | 384/480 |
| 3,899,226 | 8/1975 | Frost et al. | 384/480 |
| 4,010,987 | 3/1977 | Jasperse et al. | 384/474 |
| 4,988,218 | 1/1991 | Quaglia | 384/473 X |

FOREIGN PATENT DOCUMENTS

WO-A-
8702747 5/1987 Australia .

Primary Examiner—Thomas R. Hannon
Attorney, Agent, or Firm—McGlew and Tuttle

[57] ABSTRACT

The bearing arrangement is suitable in particular for the mounting of molds for the production of plastic pipes by the centrifugal molding process. It has a ball bearing whose inner bearing ring (5) sits on the pipe (3) which is to be freely rotatably mounted and whose outer bearing ring (7) is held in a support ring (13). Covering rings, one (17, 19) of which on each bearing side is coordinated with the inner (5) bearing ring and one (11, 12) with the outer (7) bearing ring, serve for protection from water and humidity. These covering rings (17, 18, 11, 12) are such that, in pairs, they form a labyrinth seal. The covering rings (11) coordinated with the outer, i.e. the fixed, bearing ring (7) are provided with an injection nozzle (31) for lubricating oil and compressed air and with an outflow orifice (22) for water which has entered and a discharge orifice (36) for the lubricating oil. It is therefore possible to prevent the penetration of splashes, continuously to lubricate the bearing and to generate in the bearing a positive pressure which prevents air or water from being sucked in by heating or cooling with water.

11 Claims, 1 Drawing Sheet

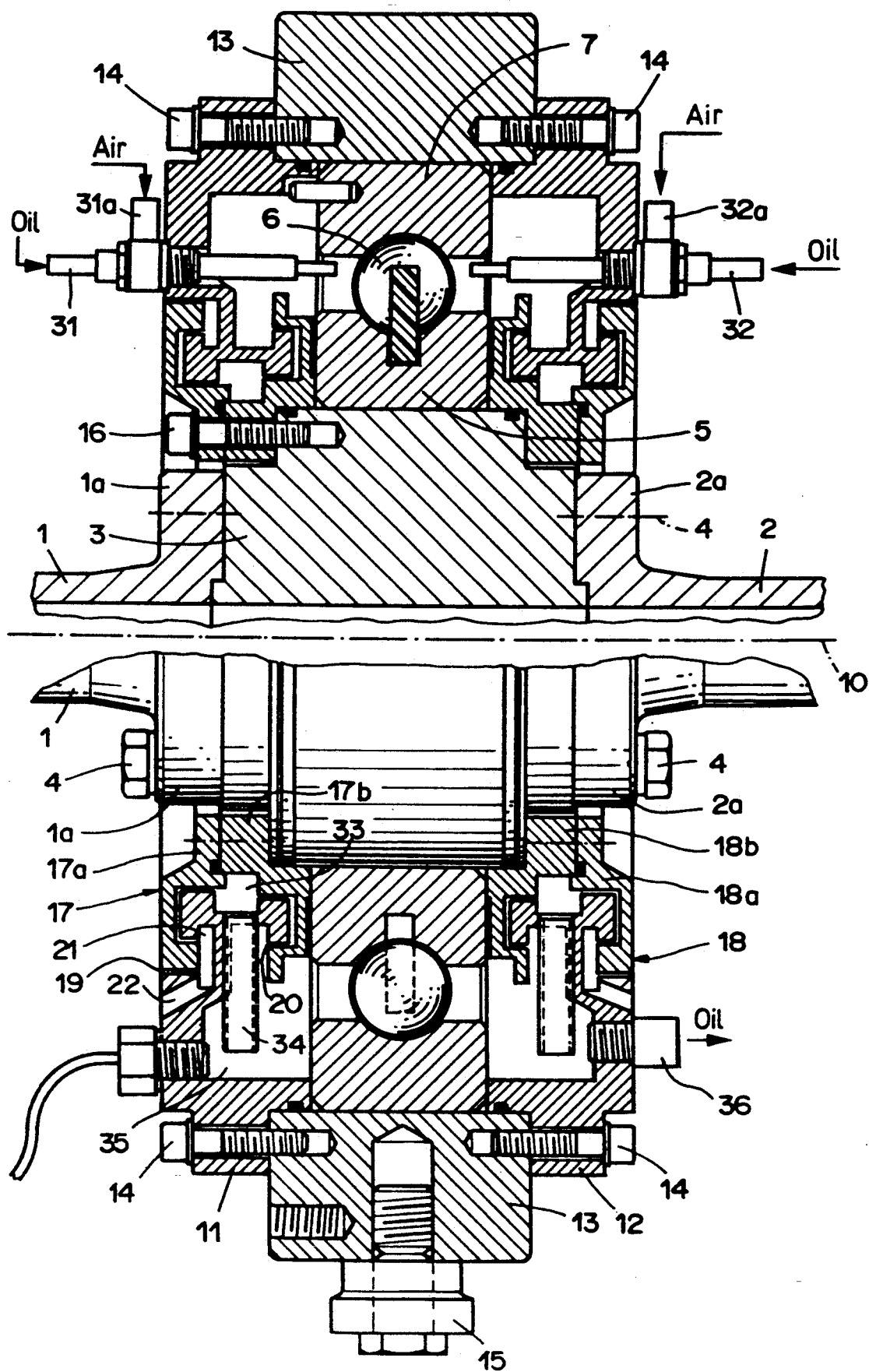

SPLASH-PROOF BEARING ARRANGEMENT HAVING A HORIZONTAL AXIS

FIELD AND BACKGROUND OF THE INVENTION

For the freely rotatable mounting of a drum-like mold for the production of plastic pipes by the centrifugal molding process, large bearing means are required which should be as quiet as possible for environmental protection reasons and must be splash-proof so that the matrix can be heated and cooled with water from the outside. Bearings of this type are unknown to date so that the bearing according to the present invention makes it possible to satisfy the need which has existed up to the present.

SUMMARY AND OBJECTS OF THE INVENTION

The bearing arrangement according to the invention has a ball bearing whose outer bearing ring is fixed. In this arrangement, two bearing rings are coordinated on each of both sides with a covering ring which is such that the two rings of each side together form a labyrinth seal open axially outward and axially inward. An injection nozzle serves for the injection of compressed air and lubricant into the bearing and a discharge pipe for the lubricant is arranged in each of the two covering rings coordinated with the fixed bearing ring.

In a particularly advantageous embodiment, the two covering rings associated with the freely rotatable bearing ring are each composed of an inner and an outer ring, and that edge of each fixed covering ring which is close to the axis is surrounded by that edge of the associated freely rotatable covering ring which is remote from the axis in such a way that two grooves running around the ring are formed, each of the two fixed covering rings having a downward-pointing outflow orifice from one of these annular grooves.

The various features of novelty which characterize the invention are pointed out with particularity in the claims annexed to an forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

The single FIGURE is a partial cross-sectional view of the present invention.

DETAILED DESCRIPTION OF THE PREFERRED EMBODIMENT

The single FIGURE of the drawings shows a vertical section through a bearing arrangement according to the invention, large parts on either side of axis 10 having been omitted in the diagram. This arrangement serves for the freely rotatable mounting of a drum-like mold. The drawings shows a section of the mold which is formed from two pipe sections 1 and 2 provided with flanges 1a and 2a on the first and second axial ends of the bearing, respectively, and a pipe ring 3 in between, to which the two pipe sections 1 and 2 are screwed by means of screws 4. The inner bearing ring 5 of the ball bearing, whose balls are denoted by 6 and whose outer bearing ring or rotating member by 7, sits on the pipe ring 3. This outer bearing 7 is held on the fixed support ring 13 by an outer first covering ring 11 and an outer second covering 12 screwed firmly by means of screws 14 to this support ring 13. The support ring 13 may be held on a bearing block by means of screws 15, of which only one is shown in the drawings. Inner first and second covering rings, which are denoted here by 17 and 18 and are screwed to the pipe ring 3 by means of screws 16, serve for holding the inner bearing ring 5 on the pipe ring 3. Both the inner first covering ring 17 inner second covering ring 18 each consist of an inside and an outside ring, the inner rings being denoted by 17a and 18a and the outer rings by 17b and 18b.

An outer circumferential edge of the inner covering ring 17 is removed or spaced opposite from the axis surrounds that edge of the covering ring 11 which is on a side of the covering ring 11 that is close to the axis. The two edges are formed in such a way that, as can readily be seen from the drawings, these two edges or edge regions together form a labyrinth seal. As shown in the drawings, the inside and outside rings 17a and 17b define a T-shaped channel, and outer ring 11 forms a T-shaped rim positioned inside the T-shaped channel. This seal has a gap 19 opening axially outward and a gap 20 opening axially inward. The gap 19 connects with an outside annular groove 21 which is provided at its lowest point with a downward-pointing outflow orifice 22 through which water, which has penetrated somewhere through the gap 19, for example as splashes, can flow away again.

Since the two covering rings 12 and 18 have exactly the same form as the covering rings 11 and 17, a detailed description of them is unnecessary.

In the upper region, each of the two covering rings 11 and 12 is provided with an injection nozzle 31 and 32, respectively, which also has a compressed air connection 31a and 32a, respectively. The inner of these two injection nozzles is directed toward the region in which the balls 6 move. This permits, on the one hand, continuous lubrication of the balls and their bearing surfaces and, on the other hand, a constant positive pressure preventing the entry of humid outside air. This is particularly important when the bearing is used in a humid environment with changeable temperatures, and there is the danger that, when the bearing parts cool, the air in the bearing would also cool and additional air, which may be humid, would then be sucked in.

As can likewise be seen from the drawings, the two covering rings are such that, in addition to the annular groove 21 described above, they form a second or inner annular groove denoted here by 33. This is provided at its lowest point with an oil discharge pipe 34 which enters the space 35 defined by the ball bearings and the two covering rings 11 and 17. The space 35 is provided, slightly above its lowest point, with a return connection 36 serving as an oil discharge, and the oil discharge pipes connected to it may enter a lower-line oil reservoir or may be provided with an oil pump. Since the return connection is located slightly above the lowest point, the existence of an oil sump and hence also constant lubrication of the bearing are ensured. Compressed air flowing through the compressed air connections 31a and 32a prevents the formation of a vacuum, which may allow the penetration of water or humid air, in the interior of the bearing as a result of the oil flowing out or being sucked out.

The extremely simple structure of the bearing arrangement according to the invention is evident from the above: two covering rings are mounted on both sides of a ball bearing, one of which is in the form of a single piece and the other in the form of two parts, the covering rings coordinated with the stationary bearing ring being provided in its upper region with an injection nozzle and in its lower region with a water outflow pipe and an oil discharge pipe.

I claim:

1. A bearing arrangement comprising:
   an inner bearing ring;
   an outer bearing ring positioned radially spaced from said inner bearing ring;
   bearing means positioned between said inner bearing ring and said outer bearing ring and for rotatably connecting said inner and outer bearing rings;
   inner first and second covering rings connected to substantially opposite axial sides of said inner bearing ring, both of said inner first and second bearing rings having an outer circumferential edge;
   outer first and second covering rings connected to substantially opposite axial sides of said outer bearing ring, said outer first and second bearing ring having an inner circumferential edge, said inner circumferential edge of said outer first covering ring and said outer circumferential edge of said inner first covering ring interacting to from a labyrinth seal with an axial outward opening and an axially inward opening, said inner circumferential edge of said outer second covering ring and said outer circumferential edge of said inner second covering ring interacting to form a labyrinth seal with an axial outward opening and an axially inward opening;
   injection nozzle means for injecting compressed gas and lubricant at said bearing means;
   discharge means for removing the lubrication after the lubrication has lubricated said bearing means; said injection nozzle means and said discharge means are positioned in said outer first and second covering rings.

2. A bearing arrangement in accordance with claim 1 wherein:
   said outer bearing ring and said outer first and second covering rings are fixed;
   said inner bearing ring is rotatable.

3. A bearing arrangement in accordance with claim 1 wherein:
   each of said inner first and second covering rings has an inside ring and an outside ring, both said inside ring and said outside ring having an outer circumferential edge;
   said inner circumferential edge of said outer first covering ring being surrounded by said outer circumferential edge of said inside and outside rings of said inner first covering ring;
   said inner circumferential edge of said outer second covering ring being surrounded by said outer circumferential edges of said inside and outside rings of said inner second covering ring.

4. A bearing arrangement in accordance with claim 1 wherein:
   each of said first outer first and second covering rings define first and second annular grooves substantially concentric with said inner and outer coverings rings, said outer covering rings defining an outflow orifice for removing fluids from one of said first and second grooves.

5. A bearing arrangement in accordance with claim 1 further comprising:
   a support, said outer first and second covering rings being connected to said support, and said outer first and second covering rings holding said outer bearing ring to said support.

6. A bearing arrangement in accordance with claim 1 further comprising:
   a rotating member, said inner first and second covering rings being connected to said rotating member, and said inner first and second covering rings holding said inner bearing ring to said rotating member.

7. A bearing arrangement comprising:
   an inner bearing ring;
   an outer bearing ring positioned radially spaced from said inner bearing ring;
   bearing means positioned between said inner bearing ring and said outer bearing ring and for rotatably connecting said inner and outer bearing rings;
   an inner covering ring connected to said inner bearing ring, said inner bearing ring having an outer circumferential edge;
   an outer covering ring connected to said outer bearing ring, said outer bearing ring having an inner circumferential edge, said inner circumferential edge of said outer covering ring and said outer circumferential edge of said inner covering ring interacting to form a labyrinth seal with an axial outward opening and an axially inward opening;
   injection nozzle means for directing compressed gas and lubricant to said bearing means;
   discharge means for removing the lubrication after the lubrication has lubricated said bearing means; said injection nozzle means and said discharge means are positioned in said outer covering ring.

8. A bearing arrangement in accordance with claim 7 wherein:
   said inner covering ring defines a T-shaped channel;
   said inner circumferential edge of said outer covering ring forms a T-shaped rim positioned inside said T-shaped channel.

9. A bearing arrangement in accordance with claim 7 wherein:
   said inner covering ring has an inside ring and an outside ring, both said inside ring and said outside ring defining a T-shaped channel;
   said inner circumferential edge of said outer covering ring forming a T-shaped rim positioned inside said T-shaped channel.

10. A bearing arrangement in accordance with claim 7 wherein:
    said inner and outer covering ring define first and second annular grooves substantially concentric with said inner and outer covering rings, one of said inner and outer covering rings defining a first outflow orifice for removing fluids from said first groove to a side of said covering rings opposite said bearing means, also one of said inner and outer covering rings defining a second outflow orifice for removing fluids from said second groove to a side of said covering rings adjacent said bearing means.

11. A bearing arrangement in accordance with claim 10 wherein:
    said first and second orifices guide the fluid by gravity flow.

* * * * *